United States Patent

Kamel et al.

[11] Patent Number: 6,078,998
[45] Date of Patent: Jun. 20, 2000

[54] REAL TIME SCHEDULING OF PRIORITIZED DISK REQUESTS

[75] Inventors: Ibrahim Mostafa Kamel, Alexandria, Egypt; Thirumale Niranjan, Stony Brook, N.Y.; Shahram Ghandeharizadeh, Lawrenceville, N.J.

[73] Assignee: Matsushita Electric Industrial Co., Ltd., Osaka, Japan

[21] Appl. No.: 08/799,090

[22] Filed: Feb. 11, 1997

[51] Int. Cl.[7] .............................. G06F 12/00; G06F 13/00
[52] U.S. Cl. ............................ 711/151; 711/11; 711/158; 711/160
[58] Field of Search ...................... 711/151, 113, 711/4, 111, 152, 154, 158, 160, 118

[56] References Cited

U.S. PATENT DOCUMENTS

| | | | |
|---|---|---|---|
| 4,685,125 | 8/1987 | Zave | 379/96 |
| 5,325,526 | 6/1994 | Cameron et al. | 395/650 |
| 5,548,795 | 8/1996 | Au | 395/872 |
| 5,737,547 | 4/1998 | Zuravleff et al. | 395/292 |
| 5,737,747 | 4/1998 | Vishlitzky et al. | 711/118 |
| 5,761,692 | 6/1998 | Oden et al. | 711/4 |

OTHER PUBLICATIONS

Abdelhakim Hafid, Gregor V. Bochmann and Brigitte Kerherve, "A Quality of Service Negotiation Procedure for Distributed Multimedia Presentational Applications", IEEE, 330–339, 1996.

Robert K. Abbott and Hector Garcia–Molian, "Scheduling I/O Requests with Deadlines: a Performance Evaluation", IEEE, 113–124, 1990.

*Primary Examiner*—Tuan V. Thai
*Attorney, Agent, or Firm*—Harness, Dickey & Pierce, P.L.C.

[57] ABSTRACT

A single queue is utilized for scheduling of prioritized requests having specific deadlines in which to be serviced. New requests are initially inserted into the single queue based upon optimal SCAN order. Once the new request is inserted, the deadlines of all the requests in the queue are checked in order to insure each request deadline is met. In the event a deadline violation is identified, the queue is reorganized by identifying the lowest priority request currently to be processed prior to the request with the deadline violation. If more than one request with the lowest priority exists, the lowest priority request with the greatest deadline slack is selected. Ultimately, the selected request is moved to the tail of the queue, or removed from the queue and considered lost if its deadline is violated with a queue tail placement. This process is repeated until the queue is in a state with no deadline violations.

14 Claims, 6 Drawing Sheets

REAL TIME SCHEDULING OF PRIORITIZED DISK REQUESTS

BACKGROUND OF THE INVENTION

1. Technical Field

This invention generally relates to resource management of storage media that are mechanical in nature. More particularly, the present invention relates to an apparatus and method for real time scheduling of prioritized requests for storage media access.

2. Discussion

Storage media resource management is important in many data-intensive applications. For example, disk resource management is an important factor in multimedia applications. Although disk technology continues to improve in speed and storage capacity, the disk bandwidth remains a critical resource in this data-intensive application. Disk technology is currently used to supply digitally stored video-on-demand. Disk technology is also used in multimedia development systems. In applications such as these multimedia applications, data requests typically have strict deadlines. These deadlines are mandated by the application. A video-on-demand system must provide the video data stream without disruptions or delays, as these produce jitter at the user's terminal. Ideally, a storage media access system should timely service all requests, without losing any of them. In reality, at high demand times, some requests may not be serviced on time, and these requests are treated as lost. Preferably, the system should prioritize requests, so that the more important requests (e.g., those paying a higher price) are handled at the expense of lower priority requests.

For example, in a block of MPEG-encoded video data stored in the form of a sequence of I, P and B frames, losing an I data block might result in the loss of more display frames than losing a P or B data block. A disk scheduling algorithm that favors the I frames over the P or B frames may result in better quality of service.

In some data-intensive applications, such as high end multimedia applications, a pricing scheme is used to prioritize data requests. Different priorities are assigned different costs, and the cost to service a data request is generally proportional to the quality of service provided. Users requesting a higher quality of service are expected to be charged more. Quality of service can be quantified in terms of jitter, lost packets, and so forth. One way of honoring different quality of service levels is to prioritize disk requests from each user, based on the pricing package they have subscribed to.

Quality of service is a somewhat more complex issue than simply one of pricing. This is because the user's perception of the quality of service during playback will vary with the medium and format of the material. For example, consider two users, one retrieving an audio stream and the other retrieving a video stream. Both data streams will require periodic disk access requests. If the streams are scheduled in a round robin fashion, disk requests for both streams will need to be serviced with identical deadlines. When the load on the disk access system is sufficiently high, at some point it will not be possible to honor all requests within their respective deadlines. This leads to a delayed (lost) request. Even minute gaps (e.g., hundreds of milliseconds) in the audio data stream will be readily perceived as a noisy, jittering signal; whereas comparable gaps in the video data stream may not even be noticed. This implies that requests for audio data may need to be processed at a higher priority than video data to deliver the same perceived quality of service.

In all of the above cases, deadlines alone are insufficient to model application requirements for media access. Media access scheduling has to be performed with a knowledge of the relative importance of the data to the application. Real time disk scheduling algorithms such as SCAN-EDF, SCAN-RT, etc., assume that all requests have the same priority. Traditionally, multiple priority requests have been handled as follows. A separate queue is maintained for each priority level. Higher priority requests always take precedence over lower priority requests. Lower priority requests can be serviced only if higher priority queues are empty. While this achieves optimal performance for highest priority requests, it usually results in lower disk utilization (lower efficiency), because there is no global optimization of the seek time. Also, low priority requests may starve under the traditional separate queue approach.

SUMMARY OF THE INVENTION

The present invention proposes a new media scheduling technique that will handle multiple priority requests, without the shortcomings of conventional technology. The media scheduling system of the invention endeavors to optimize not only priorities and deadlines, but also disk utilization and efficiency. Specifically, the present system applies a more expansive view of priorities, and provides a mechanism for global optimization of the seek time. The seek time is the time required for the read head arm and the recording medium to be properly positioned over the data requested. With the existing magnetic disk access systems, the seek time is typically the time required for the read head arm to move from the current track to the requested track. For tape access systems, the seek time is generally the time required for the tape to be wound, forward or backward, to the point where the requested data lies under the read head.

Unlike conventional techniques that employ separate queues for each priority level, the present invention employs a single queue into which all requests are inserted. The system increases disk utilization (efficiency) by servicing the requests in SCAN order whenever possible. If it is impossible to serve all requests in SCAN order, without violating deadlines, then the system automatically rearranges the order of the queue, favoring requests with higher priority and dropping requests of lower priority, as necessary.

More specifically, the system maintains a single queue for holding all media block requests, regardless of priority. When a new block request is made it is inserted in the queue according to the SCAN order, in the last SCAN cycle of the queue. Thus, the new request is inserted at a location in the queue so that it may be serviced by the read head while it is on route to a more distant location. The system then inspects the queue to determine if any deadline is violated by the proposed SCAN order. If not, then the system will terminate the insertion process, allowing the queue to designate the order in which requests shall be serviced. On the other hand, if the deadline of any request in the queue is violated due to the insertion of the new request, then the system will rearrange the queue as follows. It finds the request with the lowest priority among all of the requests in front of the inserted request, and moves that lower priority request to the tail of the queue. If there is more than one low priority candidate in front of the inserted request, the low priority request with the most relaxed deadline is moved to the tail of the queue. If the deadline of the lowest priority request, so moved, is violated, it is declared lost and it is removed from the queue. The above-described queue readjustment procedure will continue, as needed, until all of the remaining requests in the queue can be handled without deadline violation.

For a more complete understanding of the invention, its objects and advantages, reference may be had to the following specification and to the accompanying drawings.

DETAILED DESCRIPTION OF THE PREFERRED EMBODIMENTS

While the following description of the preferred embodiment is presented with reference to disk storage media, it is important to note from the onset that the apparatus and method shown are not in any way limited to disk storage systems, but are applicable to storage media which is sequentially accessed.

Figure 1:
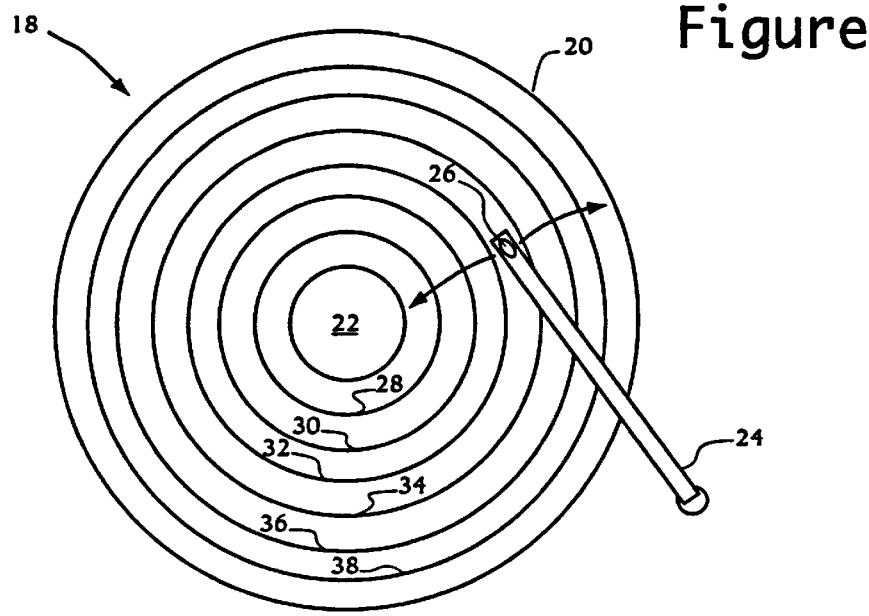
FIG. 1 is a top view illustration of a conventional disk storage system.
Figure 2:
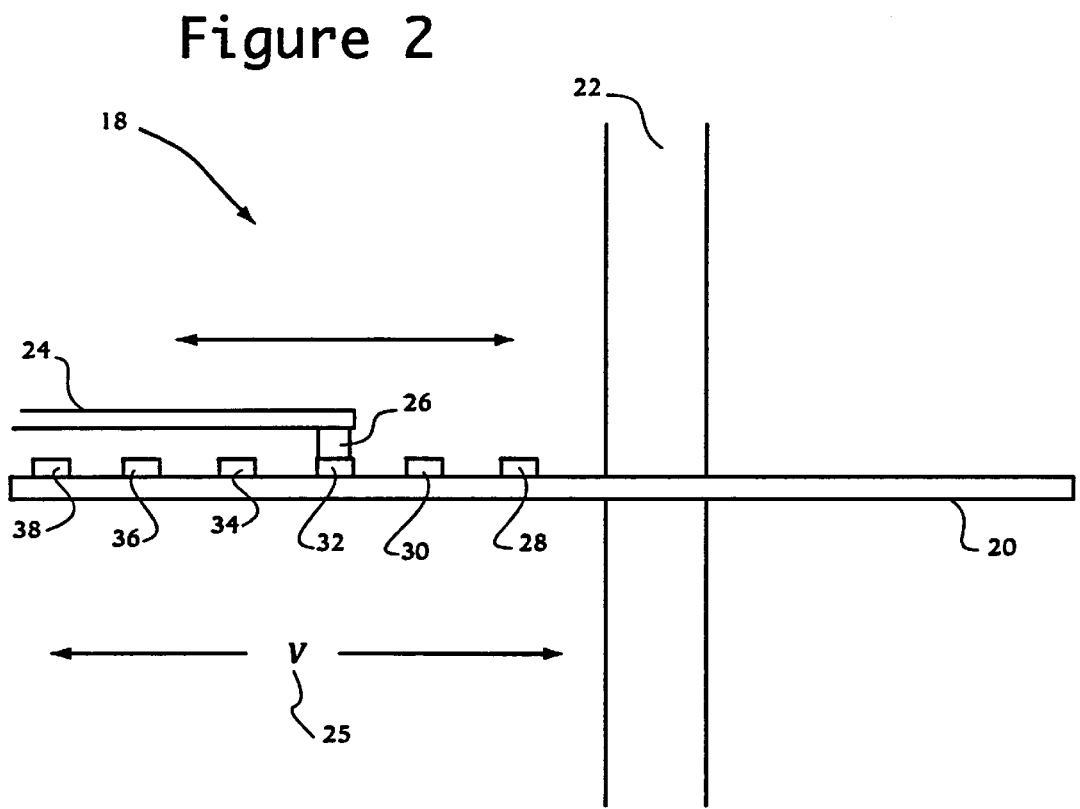
FIG. 2 is a side view illustration of the conventional disk storage system of FIG. 1.

FIG. 1 illustrates the two major components of a conventional disk storage system 18, and FIG. 2 illustrates a side view of the conventional disk storage system 18 of FIG. 1. The first component of the conventional disk storage system 18 is a circular mounted plate or disk 20 mounted on a central spindle 22, and the second component is a mechanical access assembly or arm 24, having a read/write head 26, which is able to move across the surface of the disk 20 while the disk 20 is made to rotate. This mechanical access assembly is termed disk arm.

In one common configuration, the disk 20 has multiple tracks on its surface. A track is that part of the disk 20 surface which can be read without moving the disk arm 26. The individual tracks make a series of concentric circles corresponding to the position of the disk arm. The number of tracks per surface varies, ranging from a small number (e.g., thirty tracks) to thousands of tracks. For illustrative purposes, only six tracks (28, 30, 32, 34, 36, 38) are shown on disk 20. The quantity of data which can be stored in a track is usually too large to be transferred in one read from the computer's memory. Therefore, a track is divided into a number of sectors, with the sector containing the unit of data which can be transferred. The disk system 18 has a means of determining the current position of the disk 20 relative to the arm.

Every access to the disk 20 generally involves movement of the arm relative to the disk. In addition to the period of time required for the appropriate sector to move under the read/write head 26, a period of time is required for the arm 24 to move to a specific track. This time is dependent on the distance, measured as number of tracks, traversed by the arm. Therefore, an undesirable time penalty exists if tracks are traversed and re-traversed by the arm 24 in order to obtain information contained in sectors of different tracks.

For example, if data from a sector contained in track 28 is requested, followed by a request for data in a track 36 sector, then from a track 30 sector, and lastly from a track 38 sector, the access assembly 24 would be required to move through tracks 38, 36, 34, 32, 30 to first access track 28, followed by movement back through tracks 30, 32, and 34 to access track 36, then reverse direction and move through tracks 34 and 32 to access track 30, and finally move back through 32, 34, and 36 to access track 38. This large amount of movement by the arm entails a significant amount of time, and results in a lower disk bandwidth. To reduce access time some systems will try to allocate sequentially accessed information to contiguous tracks, so that minimal movement of the arm 24 is required to retrieve information. However, that is not always possible, particularly where the information will be accessed in a random order.

Efficiency of a disk storage system may also be reduced by retrieving the requested information contained in the tracks in an order that minimizes access assembly movement, i.e. by servicing the disk requests in an order which produces the smallest distance to be traveled by the arm over a storage medium. This may be referred to optimizing the SCAN order.

For example, the optimal SCAN order for requests seeking information from the six tracks of disk 20, if the access assembly is initially in a position outside the outer edge of the disk 20, is for the access assembly to scan in the following sequence: track 38, track 36, track 34, track 32, track 30, and track 28. As can be seen in FIG. 2, this sequence produces a travel distance which is the radius 25 of the disk 20, with the exclusion of additional distances created by the arm moving back towards the outer edge of the disk 20 once movement towards the spindle 22 has begun. While this sequencing would maximize the utility of the disk system by minimizing the movement of the read/write head, some systems have additional considerations which must be addressed, including request priorities and deadlines.

An example of a system giving priorities to requests is a video-on-demand multimedia application. In this type of application, customers request audio or video feeds from a source containing the associated audio or video data. The source is generally of a configuration as shown in FIGS. 1 and 2, from which the audio or video data is retrieved using a disk system 18, and ultimately provided to the requesting customer. The service cost to a customer is expected to be proportional to the Quality of Service (QOS) provided (i.e. a customer ordering a better QOS is expected to be charged an increased price), and this is typically accomplished by prioritizing requests received from customers based upon the subscribed pricing package, with the customers identified with a higher priority having their request processed prior to a customer with a lower request priority.

Priority of requests can also be based upon other factors, for instance, in the video-on-demand multimedia application a users' perception of the QOS during playback may dictate a priority level. Because a user can perceive delayed/lost frames of audio much more easily than lost frames of video, requests for audio data must be processed at a higher priority than video data.

In addition to priority levels, data requests may also have strict time periods within which they must be processed, or deadlines as they are referred. If a request is not serviced within its deadline, it is considered to be lost, and an undesirable jitter is created at the user terminal. However, in applications such as the video-on-demand multimedia application, deadlines alone are insufficient to model application requirements for disk requests, and disk scheduling must be performed with a knowledge of the relative importance of the data to the application.

Figure 3:
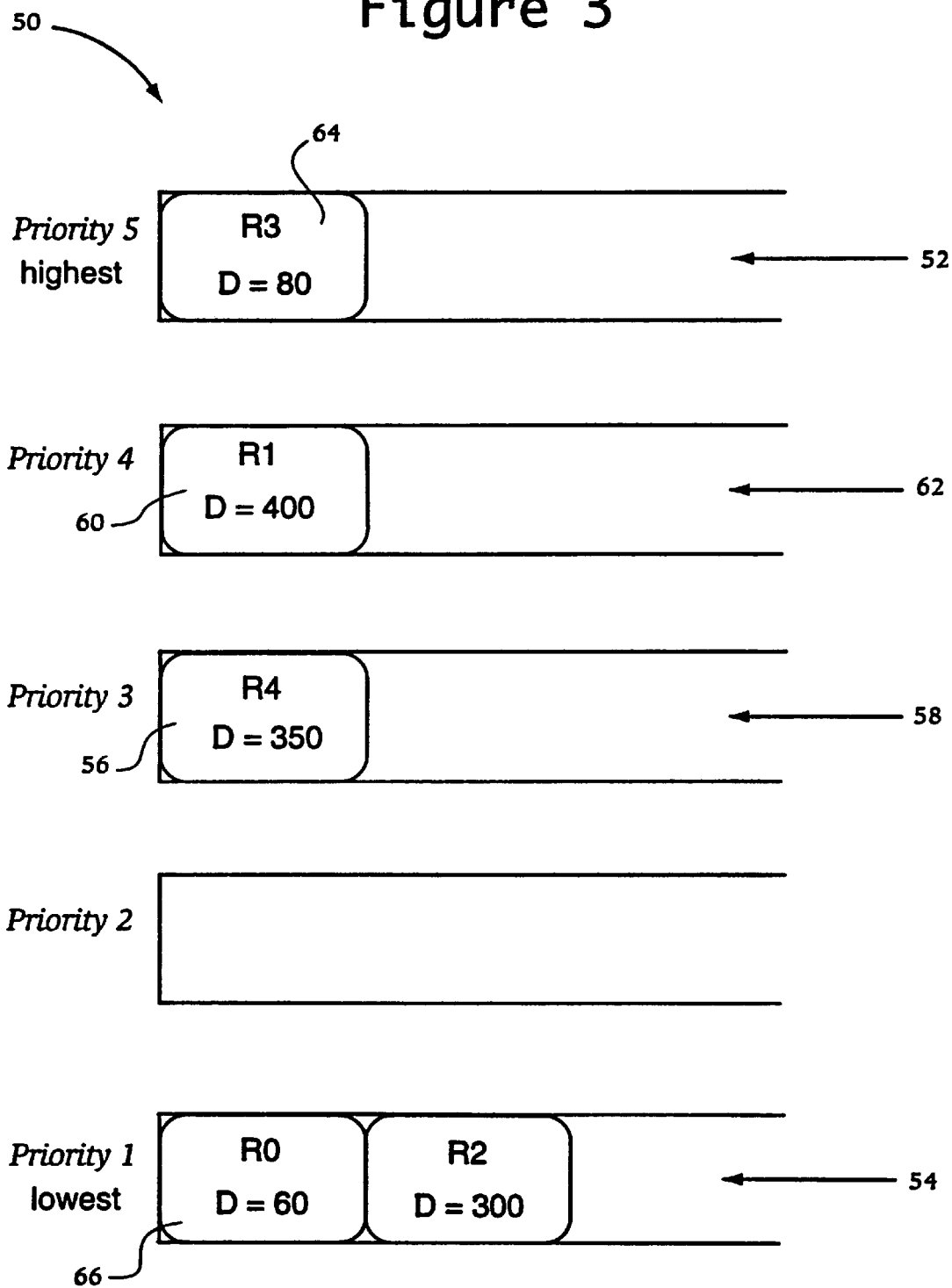
FIG. 3 is an illustration of the prior art scheduling configuration having one queue for each of the priority levels.

FIG. 3 presents the prior art configuration of a disk scheduling system 50. In this traditional treatment of multiple priority requests, strict precedence is given to higher priority requests over lower priority requests. See M. Carey, R. Jaahari and M. Livny. Priority in DBMS resource scheduling, International Conference on Very Large Data Base, Amsterdam, Netherlands, 1989, and W. Kim and J. Srivastava, Enhancing Real-Time DBMS Performance With Multiversion Data and Priority Based Disk Scheduling, 12th Real-Time Systems Symposium, pages 222–231, 1991. The scheduling system 50 has one queue for each priority level. In this presentation, the scheduling system 50 has five queues which correspond to the five priority levels, with the Priority 5 queue 52 having the highest priority and the Priority 1 queue 54 having the lowest priority. The requests from a queue are scheduled only if there are no pending requests in any queue having a greater priority. For example, request 4 56 contained in Priority 3 queue 58 would not be processed until request 1 60 contained in Priority 4 queue 62 and request 3 64 in Priority 5 queue 52 had been scheduled. This scheme provides optimal performance in terms of response time and loss rate for high priority requests only, but the scheme is not necessarily good for overall performance.

The poor overall performance of the prior art scheduling scheme can be explained with the following example. Continuing to refer to FIG. 3, suppose that all the requests require the same service time of 20 msec (service time is the period necessary to complete the access and retrieval of information). As each request arrives, it is assigned a priority and ultimately placed in the queue of the assigned priority value. As shown, request 0 66 has a low priority of 1 and a tight deadline of 60 msec. Under the prior art scheme, request 0 66 will not be serviced until all the requests in the higher priority queues have been scheduled, including request 1 60 and request 4 56 which have very relaxed deadlines. Based upon this scheduling, 60 msec will be required to service the three higher priority requests, but this will violate the 60 msec deadline of request 0 66, therefore request 0 66 would be lost. However, if request 0 66 were allowed to be serviced before request 1 60 and request 4 56, request 0 66 would be saved, and the deadlines of the higher priority requests would not be violated, resulting in an increased overall performance of the system. It is upon this premise that the preferred embodiment of the present invention is based.

The disk scheduling method and apparatus of the preferred embodiment of the present invention takes into account not only the performance of the high priority requests, but also the total performance of the system in an attempt to maximize the net profit. The process attempts to service low priority request with tight deadlines if the deadlines of the high priority requests permit. Additionally, the preferred embodiment of the present invention maximizes the disk utilization by minimizing the seek time through scheduling which seeks an optimal SCAN order.

The preferred embodiment attempts to satisfy three conditions whenever possible. The first condition is that the bandwidth efficiency should not be reduced. This is accomplished by maintaining the optimal SCAN order, or by at least minimizing any scrambling. The second condition is that reorganization to minimize scrambling or to provide an optimal SCAN order should not result in the loss of a higher priority request. Lastly, the number of lost requests should be minimized. The second and third conditions can be captured by defining a function that represents the cost of a request for each priority level. Losing a request in each priority level would lead to a different cost, therefore the ultimate goal would be to minimize the total cost to the system. It is important to keep in mind that the scheme used must be efficiently implementable, therefore it is not possible to enumerate all possible valid scheduling orders at a given time so that the best schedule may be chosen.

Figure 4:
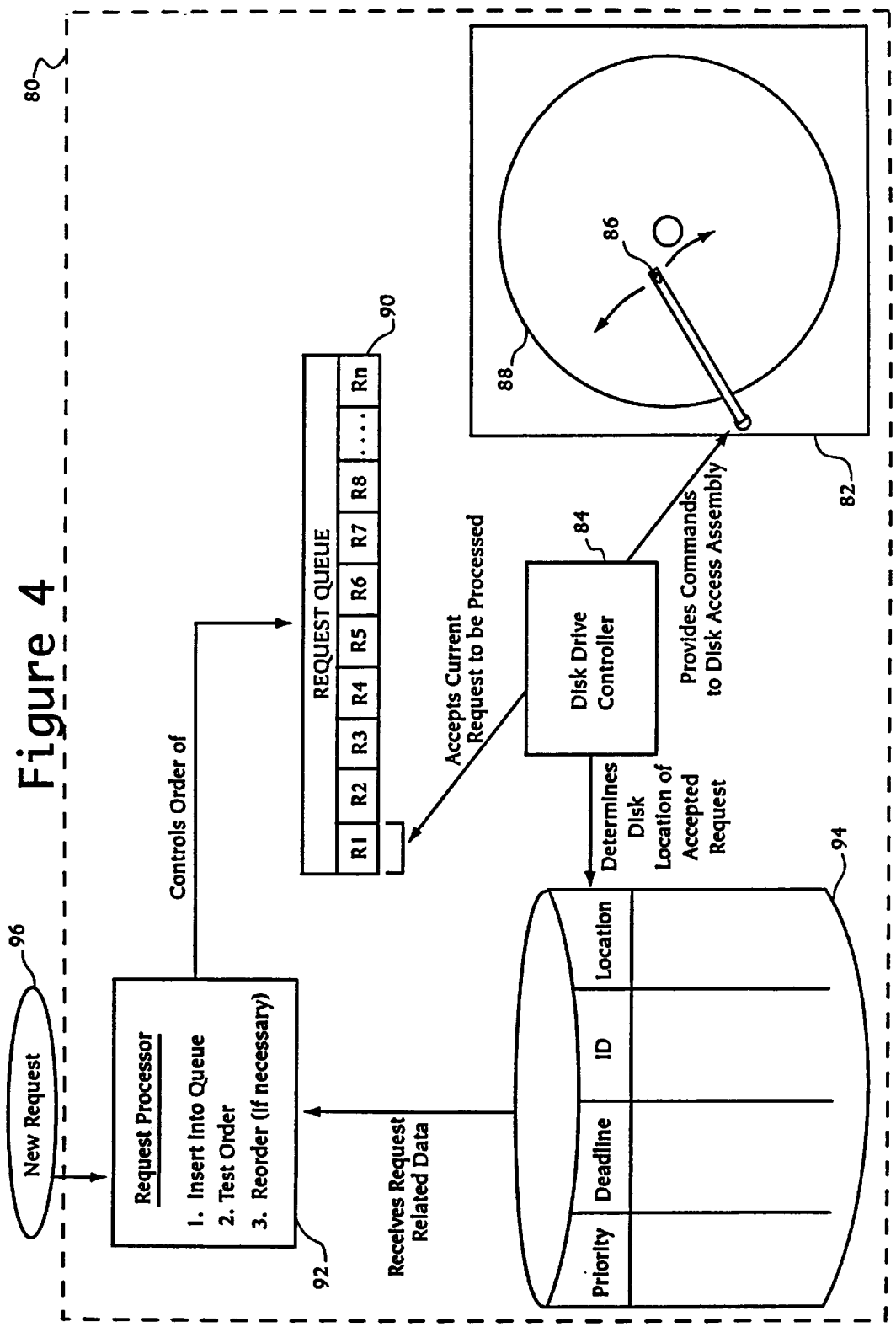
FIG. 4 is a system overview of the apparatus for scheduling prioritized requests for storage media access of the preferred embodiment of the present invention.

FIG. 4 shows the disk scheduling system 80 of the preferred embodiment of the present invention. The system consists of a disk storage system 82, a disk drive controller 84 which provides the necessary commands to position the read/write access head 86 for retrieval of data from the disk 88, a single request queue 90 containing all the multiple priority level requests to be processed, and a request processor 92 which controls the order of the request queue 90 based upon request related data 94.

When a new request 96 is presented to the disk scheduling system 80, it is received by the request processor 92. The request processor 92 first inserts the new request into the request queue 90. After the insertion, the request processor 92 tests the request queue 90 to determine if any of the deadlines of the requests in the request queue 90 have been violated. The request processor 92 obtains the deadline information from the request related data 94. If all of the deadlines for the requests can be met, the request processor takes no further action. However, if a deadline of a request is exceeded given the current order, the request processor reorders the queue based upon priority and deadline data contained in the request related data 94.

Figure 5:
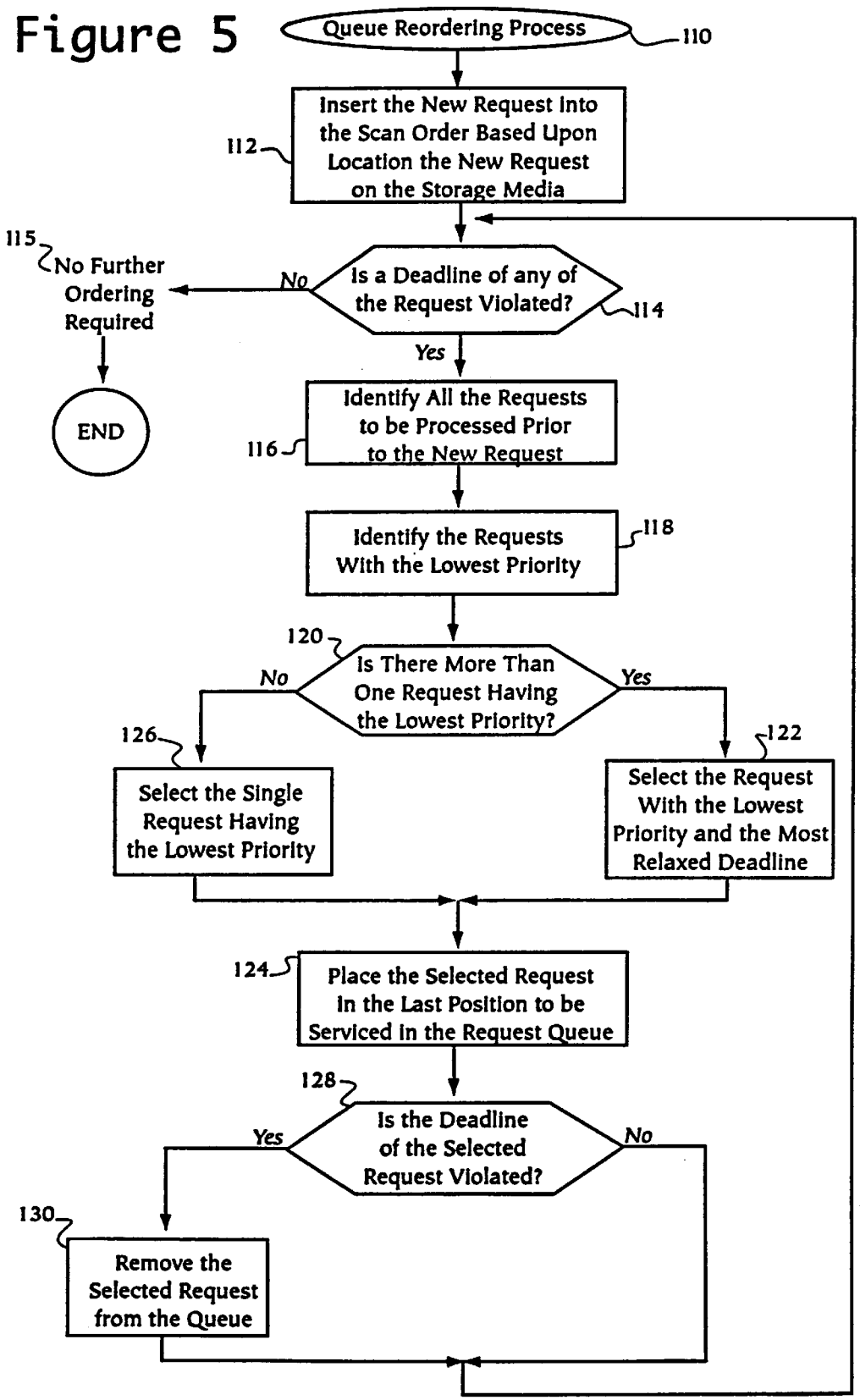
FIG. 5 is a flowchart of the queue ordering process of the preferred embodiment of the present invention.

FIG. 5 presents the flowchart of the process used by the request processor in determining the order of the request queue. As previously indicated, the process 110 begins by inserting the New Request into the request queue based upon SCAN order 112. After this insertion 112, the order is tested to determine if a request deadline is violated 114. If all the deadlines are met, the order of the request queue is proper and no further reordering is done by the request processor 115. However, if a deadline of any request is violated, the processor reorders the request queue.

The first step in reordering the request queue is to identify all the requests which are to be processed prior to the request with the deadline violation 116. From this subset, the requests that have the lowest priority are selected 118. From this group, it is determined whether there is a single request having the lowest priority or multiple requests in the lowest priority class 120. In the event that there are multiple requests in the low priority group, the request with the most relaxed deadline is selected 122 and placed in the last position of the request queue which will be serviced 124. If there is only a single request which has the lowest priority, this single low priority request is selected 126 and moved to the last service position of the request queue 124.

The deadline of the request in the last service position is then tested to determine if its deadline is violated 128, and if it is, it is declared to be lost, and removed from the queue 130. The queue is then retested to insure that none of the deadlines are violated 114, and the reordering process is either initiated or terminated 115.

Figure 7:
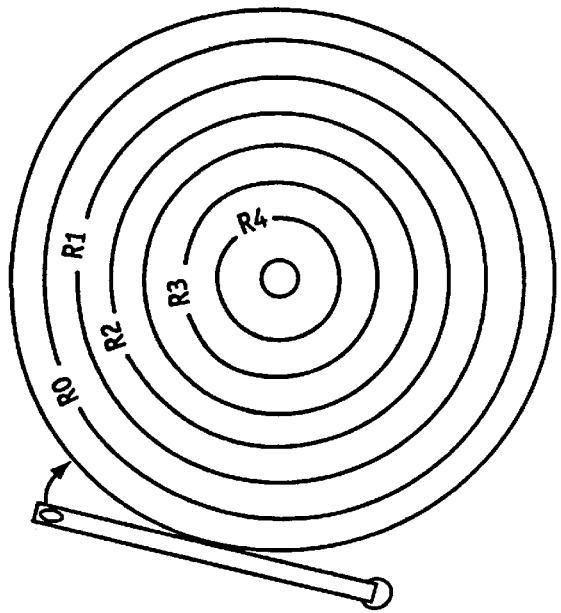
FIG. 7 is an illustration showing the disk locations of the FIG. 6 requests in SCAN order.
Figure 6:
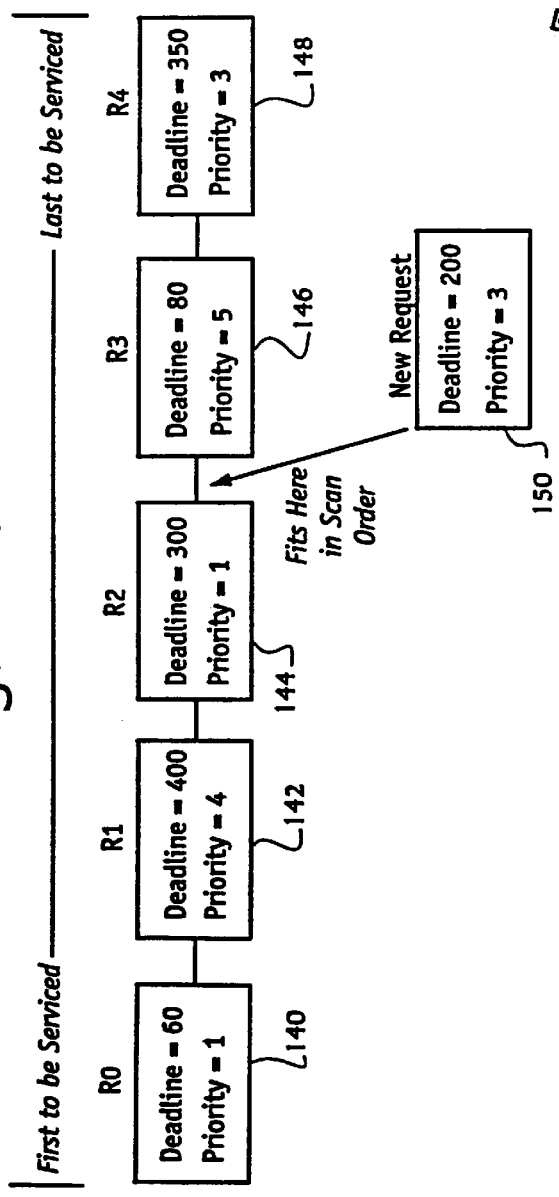
FIG. 6 is an illustration of the single scheduling queue of the preferred embodiment of the present invention prior to the insertion of a new request.

In order to provide additional insight into this method of the disk scheduling system, the following example is presented. FIG. 6 shows four requests (140, 142, 144, 146, 148) and a newly received request 150. As shown in FIG. 7, these requests are placed in the request queue based upon the most efficient SCAN order possible, which in this illustration is optimal.

Figure 8:
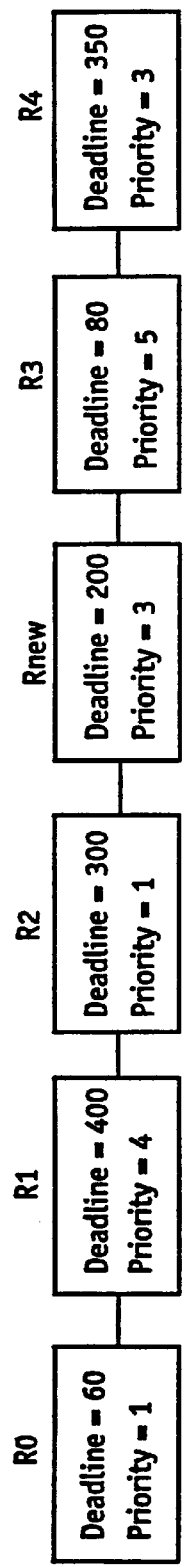
FIG. 8 is an illustration of the single queue of the preferred embodiment of the present invention after the insertion of a new request creating a deadline violation.

Referring to FIG. 8, upon receipt of the new request 150, the new request is tentatively placed in a position which results in a preferred SCAN order (which as shown in FIG. 7 is between request 2 and request 3). If the insertion of the new request 150 does not lead to a deadline violation of any of the requests in the queue, no further action is taken, and the queue is proper as ordered.

However, in this example, if it is assumed that the service time for each request is 20 msec, the deadline for request 3 146 would be violated with the insertion of the new request 150. Therefore, the queue must be reorganized.

Figure 9:
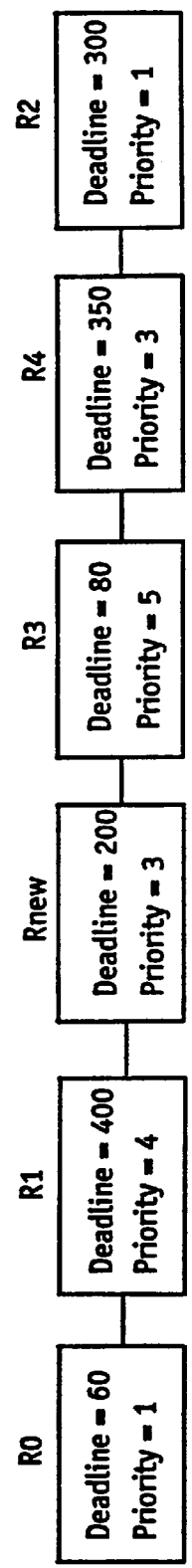
FIG. 9 is an illustration of the single queue of the preferred embodiment of the present invention after reorganization.

Among the request which are currently to be processed prior to the request with the deadline violation, request 3 146, request 2 144 has the least priority and the most relaxed deadline. Therefore, as shown in FIG. 9, request 2 144 is moved to the tail of the queue. This order of the queue is then analyzed to determine if there are any deadline violations, and as can be seen, none exist. This order then allows servicing the existing request without request losses, respecting priority, and maintaining an order which is closest to the SCAN order which maximizes the utility of the storage media.

From the foregoing it will be appreciated that although the present invention has been illustrated and described with reference to disk media, it will be apparent that the techniques employed in the illustrative embodiment can be applied to other applications. Accordingly it will be understood that the invention is capable of certain modification or change without departing from the spirit of the invention as set forth in the appended claims.

What is claimed is:

1. A storage medium scheduler for maximizing utilization of a storage of a storage medium, comprising:
   a single scheduling queue;
   a plurality of requests having priorities and deadlines held by said single scheduling queues, said priorities being independent from said deadlines, said plurality of requests having an execution order; and
   a processor which arranges the execution order of said plurality of requests based upon SCAN order and said priorities and deadlines;
   wherein said processor is capable of inserting a new request into said single scheduling queue and then reorganizing said single scheduling queue if one of said deadlines is violated such that the execution order of said single scheduling queue remains in SCAN order and continues to respect said priorities of said plurality of requests.

2. The storage medium scheduler of claim 1 wherein said storage medium contains audio data of a video-on-demand multimedia application.

3. The storage medium scheduler of claim 1 wherein said storage medium contains video data of a video-on-demand multimedia application.

4. The storage medium scheduler of claim 1 wherein said priorities are based upon Quality of Service cost to a customer.

5. The storage medium scheduler of claim 1 wherein said priorities are dictated by user ability to perceive a lost frame of data.

6. The storage medium scheduler of claim 1 wherein said storage medium is a magnetic storage disk.

7. The storage medium scheduler of claim 1 wherein said storage medium is an optical storage disk.

8. The storage medium scheduler of claim 1 wherein said storage medium is magnetic tape.

9. A real time system for scheduling prioritized disk requests such that a storage media is maximally utilized, the prioritized disk requests specifying locations on the storage media that contain information specified by the prioritized disk requests and which require movement of an access assembly to be retrieved, comprising:
   a single queue for holding said prioritized disk requests;
   a memory having priority data, deadline data and storage media location data for each of said prioritized requests, said priority data being independent from said deadline data;
   a processor which utilizes said priority data, deadline data and storage media location data to insert a new request into said single queue;
   a storage media controller which commands said access assembly to retrieve information from said storage media in an order specified by said single queue, whereby utilization of said storage media is maximized;
   wherein said processor reorganizes said single queue if a deadline of said prioritized disk request is not met, wherein said reorganization comprises:
   (a) identifying prioritized requests in said single queue which are to be serviced prior to a prioritized request with a deadline violation;
   (b) identifying a prioritized request with lowest priority; and
   (c) placing said prioritized request with the lowest priority in the last position of said single queue to be serviced.

10. The real time system for scheduling prioritized disk request of claim 9 wherein siad new request is intially inserted into said single queque based upon storage location data.

11. The real time system for scheduling prioritized disk request of claim 9 wherein said processor tests said single queue in order to determine if a deadline of said prioritized disk requests is not met.

12. The real time system for scheduling prioritized disk requests of claim 10 wherein said deadline data is used in placing said prioritized request with the lowest priority in the last position of said single queue to be serviced.

13. The real time system for scheduling prioritized disk requests of claim 10 wherein said prioritized request with the lowest priority and placed in the last position of said single queue to be serviced is removed from said single queue.

14. A method for scheduling execution of storage media requests having separate priorities and deadlines, comprising the steps of:
   (a) organizing a plurality of requests based upon a SCAN order;
   (b) creating a new organization of said plurality of requests which includes a new request placed in said SCAN order;
   (c) identifying a deadline violated request contained in said new organization;
   (d) generating a subset of said new organization which contains those requests to be executed prior to said deadline violated request and having the lowest priority;
   (e) identifying a request with the most relaxed deadline from said new organization subset;
   (f) placing said request with the most relaxed deadline at the position within said new organization such that said request with the most relaxed deadline will be executed last; and
   (g) removing said request with the most relaxed deadline.

* * * * *